United States Patent [19]

Borchardt

[11] Patent Number: 4,536,303

[45] Date of Patent: Aug. 20, 1985

[54] METHODS OF MINIMIZING FINES MIGRATION IN SUBTERRANEAN FORMATIONS

[75] Inventor: John K. Borchardt, Houston, Tex.

[73] Assignee: Halliburton Company, Duncan, Okla.

[21] Appl. No.: 636,942

[22] Filed: Aug. 2, 1984

[51] Int. Cl.$^3$ .................... E21B 43/12; E21B 43/25; E21B 43/27

[52] U.S. Cl. ................. 252/8.55 R; 166/307; 166/305.1; 252/8.55 C; 252/8.55 D; 405/264

[58] Field of Search ............ 252/8.55 R, 8.55 C, 252/8.55 D; 166/305 R, 307; 405/264

[56] References Cited

U.S. PATENT DOCUMENTS

| | | |
|---|---|---|
| 3,057,798 | 10/1962 | Knox . |
| 3,349,032 | 10/1967 | Krieg . |
| 3,434,971 | 3/1969 | Atkins . |
| 3,494,865 | 2/1970 | Andrews et al. . |
| 3,500,925 | 3/1970 | Beiswanger et al. ............... 166/275 |
| 3,562,226 | 2/1971 | Gayley . |
| 3,704,750 | 12/1972 | Miles et al. . |
| 3,794,117 | 2/1974 | Knox et al. . |
| 3,827,977 | 8/1974 | Miles . |
| 3,832,302 | 8/1974 | Lansford et al. . |
| 3,868,328 | 2/1975 | Boothe et al. . |
| 3,916,994 | 11/1975 | Maddox, Jr. et al. . |
| 3,916,995 | 11/1975 | Shupe et al. . |
| 3,916,996 | 11/1975 | Shupe et al. . |
| 3,927,718 | 12/1975 | Tate et al. . |
| 3,943,060 | 3/1976 | Martin et al. . |
| 3,962,332 | 6/1976 | Trapasso . |
| 4,055,502 | 10/1977 | Swanson . |
| 4,062,796 | 12/1977 | Gardner et al. . |
| 4,079,011 | 3/1978 | Tate . |
| 4,152,274 | 5/1979 | Phillips et al. . |
| 4,158,521 | 6/1979 | Anderson et al. . |
| 4,200,151 | 4/1980 | Tate . |
| 4,200,154 | 4/1980 | Tate . |
| 4,206,058 | 6/1980 | Tate . |
| 4,366,071 | 12/1982 | McLaughlin et al. . |
| 4,366,072 | 12/1982 | McLaughlin et al. . |
| 4,366,073 | 12/1982 | McLaughlin et al. . |
| 4,366,074 | 12/1982 | McLaughlin et al. . |
| 4,374,739 | 2/1983 | McLaughlin et al. ............ 252/8.55 |
| 4,393,939 | 7/1983 | Smith et al. . |
| 4,447,342 | 5/1984 | Borchardt et al. . |
| 4,460,483 | 7/1984 | Weaver . |
| 4,462,718 | 7/1984 | McLaughlin et al. . |

*Primary Examiner*—Herbert B. Guynn
*Attorney, Agent, or Firm*—Thomas R. Weaver; Edward F. Sherer

[57] ABSTRACT

A method of treating a permeable structure for the purpose of stabilizing fines in the structure using organic copolymers containing N-vinylpyrrolidone in the copolymer repeat unit.

19 Claims, No Drawings

METHODS OF MINIMIZING FINES MIGRATION IN SUBTERRANEAN FORMATIONS

BACKGROUND OF THE INVENTION

This invention relates to a method of treating a permeable structure such as a permeable subterranean formation using water-soluble organic copolymers containing N-vinylpyrrolidone in the copolymer repeat units in order to stabilize, in the structure, migrating fines such as silica, iron minerals, and alkaline earth metal carbonates.

The recovery of fluids such as oil or gas or combinations thereof has been troublesome in areas where the subterranean formation is composed of one or more layers or zones which contain migrating fines such as silica, iron materials, and alkaline earth metal carbonates. These fines tend to move or migrate to the well bore during the recovery of formation fluids from the particular layers or zones and frequently the migrating fines block the passageways leading to the well bore. The movement or migration of fines to the well bore is a particular problem when the fines are contacted with water foreign to the formation. Plugging or materially impairing the flow of the formation fluids towards the well bore results in a loss of these fluids to the producer and decreases the rate of hydrocarbon recovery from the well which may cause the well to be shut down because it is economically unattractive to produce therefrom. An additional adverse factor resulting from the movement of the fines towards the well bore is that they are often carried along with the formation fluids to the well bore and pass through pipes, pumps, etc., being used to recover the formation fluids to the surface with resulting damage to the moving parts as the fines are very abrasive.

Secondary and tertiary methods of recovering hydrocarbons from a subterranean formation are well known. In general, such a method involves introducing a fluid, such as water, steam, etc., into one or more injection wells which penetrate the formation and forcing the fluid toward one or more offset producing wells. Migrating fine particles during such an operation can decrease the permeability of the formation which may cause a decrease in the rate in which fluid can be injected into the formation which results in a decrease in the rate of hydrocarbon production at the offset production wells.

Migrating fine particles are frequently encountered during acidizing or fracturing operations and during sand consolidation operations. The presence of migrating fine particles during these operations can result in a decrease in the permeability of the formation which is being treated.

Gravel packing is a widely practiced method of preventing the production of sand from poorly consolidated formations. The migration of fine particles into the gravel pack can greatly reduce the permeability of the gravel pack. This can result in a decrease in the rate of production of hydrocarbons from the formation.

Consequently, in efforts to overcome these problems, various methods have been developed for treating a subterranean formation in order to stabilize portions of the formation containing migrating fines. For instance, U.S. Pat. Nos. 4,366,071; 4,366,072; 4,366,073; 4,366,074; and 4,374,739 disclose the use of organic polycationic polymers to prevent or reduce the ill effects of swelling clays or migrating fines or combinations thereof in subterranean formations. These patents are assigned to the assignee of the present invention and are hereby incorporated by reference.

The present invention provides a method of stabilizing fines within a consolidated structure such as a subterranean formation using organic copolymers which are effective in reducing the migration of fine particles in the consolidated structure. The copolymers can be either nonionic in a neutral media or can contain up to 20 percent by weight of a cationic monomer.

SUMMARY OF THE INVENTION

The present invention involves the use of organic copolymers containing N-vinylpyrrolidone in the copolymer repeat units to prevent or reduce the ill effects of migrating fines in a permeable structure such as an earthen formation penetrated by a well bore. The method is carried out by contacting the fines in the permeable structure with an effective amount of copolymer having recurring structural monomer units formed in a random fashion of the formula:

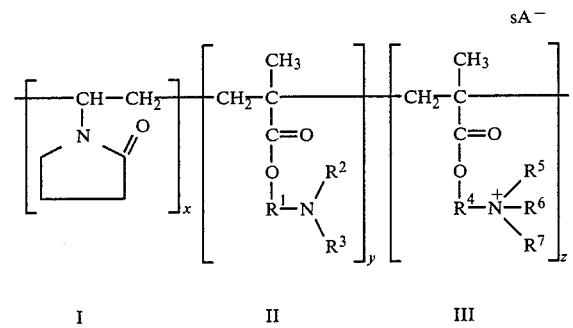

wherein $R^1$ and $R^4$ are independently selected from the group consisting of an alkylene group having 1 to about 4 carbon atoms;

$R^2$, $R^3$, $R^5$, $R^6$, and $R^7$ are independently selected from the group consisting of methyl and ethyl;

A is selected from the group consisting of chloride, bromide, iodide, hydroxide, and methyl sulfate;

s is an integer equal to the number of said anions required to maintain electronic neutrality;

x, y, and z are integers, the sum of which equals the total number of monomer units in the copolymer required to give a molecular weight in the range of from about 100,000 to about 1,500,000; and monomer unit I is present in the range of from about 80 to about 98 percent by weight of the copolymer;

monomer unit II is present in the range of from about 2 to about 20 percent by weight of the copolymer; and, monomer unit III is present in the range of from about 0 to about 20 percent by weight of the copolymer.

The copolymer which are used in the present invention contain two (binary copolymers) or three (ternary copolymers) different repeating monomer units and are random in nature. That is, the distribution of the repeating monomer units is determined by the concentration and relative reactivity of the monomers which form the repeating monomer units. The monomer units are linked together in a random sequence along the copolymer chain.

The organic copolymers used in the method of the invention are very effective in treating fines such as silica, iron minerals such as hematite, magnetite, lepidocrocite, wuestite, akaganeite, and siderite, and alkaline earth metal carbonates such as calcite and dolomite. The organic copolymers are particularly effective when used to treat permeable structures which contain greater than 5% by weight migrating fines in the mass of the structure and less than 2% by weight swelling clays. In addition, the copolymers are particularly effective when used in conjunction with an acidizing operation that utilizes strong mineral acids such as 15% by weight hydrochloric acid or mixtures of 3% by weight hydrofluoric acid and 12% by weight hydrochloric acid. A treatment with the organic copolymers of the present invention is essentially permanent and the copolymers are very resistant to being removed by brines, oils, or acids. Formations exhibit high permeability retention after the fines of the formation have been treated with the organic copolymers. Furthermore, the copolymers are very effective over a wide range of temperatures and are particularly effective from about 100° F. to about 200° F. No well shut-in time is required when the organic copolymers are used to carry out the method of the invention.

DETAILED DESCRIPTION OF THE INVENTION

The present invention involves the use of organic copolymers which contain N-vinylpyrrolidone to prevent the migration of fines contained in a permeable structure such as a subterranean formation. The use of the method of the invention results in stabilizing the permeable structure. These fines may or may not be present with clay minerals. Preferably, clay minerals are present in the permeable structure in an amount less than 2% by weight of the structure. The organic copolymers which are suitable for use in accordance with this invention have the following general formula:

monomer unit I is present in the range of from about 80 to about 98 percent by weight of the copolymer;
monomer unit II is present in the range of from about 2 to about 20 percent by weight of the copolymer; and,
monomer unit III is present in the range of from about 0 to about 20 percent by weight of the copolymer.

The organic copolymers of the present invention can be used to treat both natural and artificial structures which are permeable, including poorly consolidated and unconsolidated rocks. The method of the invention is particularly suited for stabilizing fine particles having a diameter of less than 10 microns. Furthermore, there is a wide range of application for the organic copolymers. These applications involve using the organic polycationic copolymers alone, as the primary treating agent, or as an auxiliary in other treatments.

N-vinylpyrrolidone of monomer unit I can be prepared by any method known in the art. For instance, one method of preparing the N-vinylpyrrolidone is to react 2-pyrrolidone with acetylene under pressure at temperatures of from about 130° to about 160° C. and in the presence of alkali metal salts of the acetylenic compounds as catalysts. This method is set forth in Kirk-Othmer, *Encyclopedia of Chemical Technology*, 2nd Edition, Vol. I, Interscience Publishers, New York, 1963, page 204.

N-vinylpyrrolidone of monomer unit I is preferably present in the copolymer in an amount of about 80 percent by weight of the copolymer.

Examples of monomer unit II which are suitable in the method of the present invention include dimethylaminoethyl methacrylate, diethylaminomethyl methacrylate, dimethylaminomethyl methacrylate, and diethylaminoethyl methacrylate.

Monomer unit II is preferably present in the copolymer in an amount of about 12 percent by weight of the copolymer.

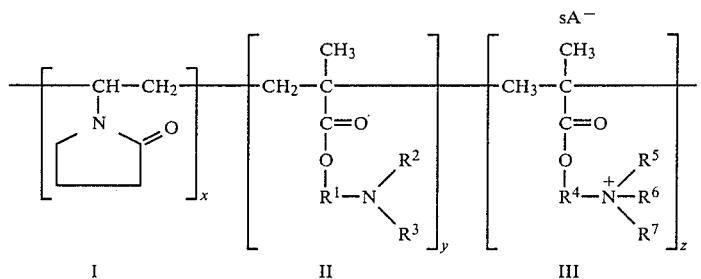

wherein
R$^1$ and R$^4$ are independently selected from the group consisting of an alkylene group having 1 to about 4 carbon atoms;
R$^2$, R$^3$, R$^5$, R$^6$ and R$^7$ are independently selected from the group consisting of methyl and ethyl;
A is selected from the group consisting of chloride, bromide, iodide, hydroxide, and methyl sulfate;
s is an integer equal to the number of said anions required to maintain electronic neutrality;
x, y, and z are integers, the sum of which equals the total number of monomer units in the copolymer required to give a molecular weight in the range of from about 100,000 to about 1,500,000; and Examples of monomer unit III which are suitable in the method of the present invention include the methyl chloride salt of dimethylaminoethyl methacrylate, the methyl chloride salt of diethylaminomethyl methacrylate, the methyl sulfate salt of dimethylaminoethyl methacrylate and the methyl sulfate of diethylaminomethyl methacrylate.

Monomer unit III is preferably present in the copolymer in an amount of from about 0 to about 10 percent by weight of the copolymer and most preferably present in an amount of about 8 percent by weight of the copolymer.

Examples of particularly preferred binary copolymers which are suitable for use in the present invention are copolymers comprising about 80 to about 98 percent by weight of N-vinylpyrrolidone and about 2 to about 20 percent by weight of dimethylaminoethyl methacrylate and copolymers comprising about 80 to about 98 percent by weight of N-vinylpyrrolidone and about 2 to about 20 percent by weight of the diethylaminopropyl methacrylate.

Examples of particularly preferred ternary copolymers which are suitable for use in the method of the present invention are copolymers comprising about 98 percent by weight of N-vinylpyrrolidone, about 0.2 percent by weight of the methyl sulfate salt of dimethylaminoethyl methacrylate, and about 1.8 percent by weight of dimethylaminoethyl methacrylate and copolymers comprising about 80 percent by weight of N-vinylpyrrolidone, about 12 percent by weight of dimethylaminoethyl methacrylate and about 8 percent by weight of the methyl sulfate salt of dimethylaminoethyl methacrylate.

The most preferred copolymer for use in accordance with the present invention comprises a copolymer having the following formula:

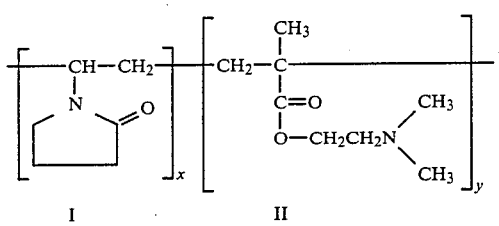

wherein
monomer unit I is present in an amount of about 80 percent by weight of the copolymer and monomer unit II is present in an amount of about 20 percent by weight of the copolymer; and, x and y are integers, the sum of which equals the total number of monomer units in the copolymer required to give a molecular weight of about 1,000,000.

The organic copolymers of the present invention should have a molecular weight of from about 100,000 to about 1,500,000. Preferably, the organic copolymers have a molecular weight of about 1,000,000. The molecular weight of the organic copolymers used in the method of the present invention will vary over a wide range depending upon the permeability of the permeable structure to be treated and the copolymer used in the method of the invention.

The amount of organic copolymer employed in the method of the present invention will vary according to, for example, the size and porosity of the particular permeable structure and the types of fines present therein. Therefore, there are no upper or lower limits in this regard.

Any suitable method of application can be used to carry out the method of the invention. For some applications such as surface or exposed structures, it may be desirable to merely spray the polymer onto the permeable mass. The essential feature is contact between the fines to be treated and the organic copolymer.

When a carrier fluid is used to carry out the method of the invention, the organic copolymers will generally be present in the carrier fluid in a concentration within the range of from about 0.01% to about 5.0% by weight of the carrier fluid. Lower or higher concentrations can be used, but are not generally as practical. When a carrier fluid is used, the preferred concentration of the organic copolymers is in the range of from about 0.25 to about 1.00 percent by weight of the carrier fluid.

Carrier fluids which can be used to carry out the method of the present invention include polar and nonpolar fluids. Examples of suitable fluids include water, brine, aqueous solutions of low molecular weight alcohols, ketones, and monoethers of glycol. Examples of suitable low molecular weight alcohols include methanol, ethanol, and isopropanol. When water is used as the carrier fluid, the carrier fluid can contain other ingredients which do not substantially interfere with the dispersion or dissolution of the organic copolymer in the carrier fluid. Furthermore, the water can be gelled or thickened for certain applications. Examples of ingredients which can be included in the water include salts, mineral acids, low molecular weight organic acids, cationic or nonionic surfactants, and wetting agents. When the copolymer used in the method of the present invention does not contain monomer unit III, the water may also contain an anionic surfactant as the copolymer has an electrical charge which is nonreactive with the electronic charge of the anionic surfactant. Preferably the carrier fluid has viscosity of less than 10 centipoises. Higher viscosity fluids may be used in certain applications by are not generally very practical due to the pressure and pumping requirements. A preferred aqueous carrier fluid is a saline solution containing about 0.1 to about 40.0 percent by weight of salt. The preferred salt concentration is about 2 to about 12 percent by weight of the solution. The salt can be an alkali metal salt, alkaline earth metal salt, an ammonium salt or mixtures thereof. Suitable anions include halides, such as chloride, bromide, iodide, and fluoride, sulfates, carbonates, hydroxides, or mixtures thereof. The halides of potassium, sodium, magnesium, calcium, ammonium, and mixtures thereof are preferred due to the economics and solubility. Aqueous acids having a concentration of about 0.1 to about 40.0 percent by weight of the solution can also be utilized in carrying out the method of the invention. Examples of suitable acids include hydrochloric acid, hydrofluoric acid, phosphoric acid, acetic acid, formic acid, citric acid, and mixtures thereof. The preferred acids include about 3 percent to about 15 percent by weight of hydrochloric acid and a mixture of about 3 percent by weight hydrofluoric acid and about 12 percent by weight of hydrochloric acid.

The method of the present invention can be used in a number of operations. For instance, the method of the present invention can be used in conjunction with sand consolidation procedures, gravel packing procedure, secondary recovery operations, and acidizing or fracturing operations. In these operations, the organic copolymers can be used to prevent or reduce the migration of fines in the subterranean formation. This results in a greater increase of permeability in the formation.

The present invention is further exemplified by the examples below which are presented to illustrate certain specific embodiments of this invention, but are not intended to be construed so as to be restrictive of the spirit and scope thereof.

EXAMPLES

A number of tests were performed to evaluate the effectivenss of various copolymers containing N-vinylpyrrolidone in the copolymer repeat units as fine stabilizers. The following monomer unit abbreviations are used herein:

TABLE I

| Monomer Unit | Abbreviation |
| --- | --- |
| N—vinylpyrrolidone | NVP |
| dimethylaminoethyl methacrylate | DMAEMA |
| dimethylaminoethyl methacrylate methyl chloride salt | DMAEMA.CH₃Cl |
| dimethylaminoethyl methacrylate dimethylsulfate salt | DMAEMA.(CH₃)₂SO₄ |

The following copolymers were utilized in the tests:

TABLE II

| Copolymer | Copolymer Designation |
| --- | --- |
| 80 weight percent NVP/20 weight percent DMAEMA (molecular weight 1,000,000) | A |
| 80 weight percent NVP/20 weight percent DMAEMA (molecular weight 100,000) | B |
| 98 weight percent NVP/2.0 weight percent DMAEMA (molecular weight 1,000,000) | C |
| 80 weight percent NVP/12 weight percent DMAEMA/8 weight percent DMAEMA.(CH₃)₂SO₄ (molecular weight 100,000) | D |
| 80 weight percent NVP/12 weight percent DMAEMA/8 weight percent DMAEMA.(CH₃)₂SO₄ (molecular weight 1,000,000) | E |

EXAMPLE I

A. Test Equipment and Procedure

The test equipment used in the tests of Example I was a TEFLON sleeved test chamber having a diameter of about 2.6 cm at the bottom of the chamber and a diameter of about 2.5 cm at the top of the chamber. The chamber design insured that, under modest applied pressure, fluid injected during the test would flow through the test sand rather than around the test sand. The test sand comprised 100 grams of a mixture of 85 percent by weight 70-170 U.S. mesh sand and 15 percent by weight silica fine particles. The silica fine particles had a median particle diameter of 22.4 microns and surface area of 1.20 m²/gram. A 100 U.S. mesh screen was placed at the base of the chamber to hold the larger particles in place.

The test chamber and fluid reservoir were heated to about 145° F. The first fluid injected into the top of the chamber during the tests comprised 236 cc of an aqueous solution containing 2 percent by weight of ammonium chloride and various concentrations of the copolymer. The injection pressure was 5 psia.

Included in these tests were treatments in which no copolymer was added to the fluid. After completion of the injection of the first fluid, the injection pressure was increased to 40 psig and 500 cc of fresh water was injected. The fresh water treatment was optionally followed by an injection at 40 psig of 400 cc of an aqueous fluid comprising 15 percent by weight of hydrochloric acid and an injection at 40 psig of 500 cc of fresh water.

The effluent of each treatment was collected and filtered through a tared piece of 0.45 micron filter paper. The solids from the effluent were collected in the filter paper, dried and weighed. The results of these tests are shown in Table III.

TABLE III

| Test No. | Polymer Used | % By Weight of Polymer In Fluid | Silica Fines Production (% by weight of Control Exper.) | |
| --- | --- | --- | --- | --- |
| | | | Before 15% HCl | After 15% HCl |
| 1. | None* | — | 100.0 | 100.0 |
| 2. | E | 0.36 | 9.5 | 8.8 |
| 3. | E | 0.25 | 14.3 | 14.4 |
| 4. | E | 0.36** | 14.3 | 26.5 |
| 5. | D | 0.35** | 38.1 | 61.8 |
| 6. | C | 0.35 | 19.1 | 38.2 |
| 7. | C | 0.25 | 9.5 | 20.6 |
| 8. | A | 0.25 | 9.5 | — |
| 9. | B | 0.23 | 9.5 | 17.6 |

*Control Experiment.
**Fluid containing the copolymer contained 0.37 percent by weight of ethanol.

Test No. 1 was a control experiment to determine the amount of silica fines produced in the absence of any copolymer. An amount of 0.21 g of fines was produced during the injection of 500 cc of fresh water and a total of 0.34 g of fines were produced after injection of the 15% hydrochloric acid. These amounts were defined, for calculations purposes, as 100% fines production.

From Table III, it can been seen that the copolymers are very effective as silica fine stabilizers even after exposure of the copolymer to an aqueous 15 percent by weight hydrochloric acid solution.

EXAMPLE II

A series of tests were performed in the same manner as Example I except that copolymers were evaluated as fine stabilizers for calcite, a mixture of 10 percent by weight silica and 10 percent by weight kaolinite, and hematite. The silica used in these tests had the same physical characteristics as Example I. The calcite had a median particle diameter of 8.9 microns and a surface area of 10.98 m²/gram. The kaolinite had a median particle diameter of 0.9 microns and a surface area of 11.92 m²/gram and the hematite had a median particle diameter of 0.9 microns and a surface area of 6.44 m²/gram. The results of these tests are shown in Table IV.

TABLE IV

| Test No. | Polymer | % By Weight of Polymer in Fluid | Fines Production | | (% By Weight of Control Exper.) (Silica-Kaolinite) | |
| --- | --- | --- | --- | --- | --- | --- |
| | | | Calcite | Hematite | Before 15% HCl | After 15% HCl |
| 1. | None* | — | 100.0 | 100.0 | 100.0 | 100.0 |
| 2. | E | 0.25 | 51.2 | 47.6 | — | — |
| 3. | E | 0.35 | — | — | 4.4 | 5.3 |
| 4. | A | 0.25 | 69.8 | 32.4 | — | — |
| 5. | A | 0.35 | — | — | 75.6 | 52.9 |

*Control Experiments.

The results of these tests show that the copolymers are effective as fine stabilizers for calcite, hematite, and a mixture of silica and kaolinite.

EXAMPLE III

Copolymer C, which does not contain a quaternary nitrogen, was tested to determine the compatibility of this copolymer with an anionic sulfonated hydrocarbon surfactant sold under the tradename of TRI-S surfactant.

A solution of the copolymer and TRI-S surfactant was prepared by mixing equal volumes of an aqueous solution containing 0.46 percent by weight copolymer C and 2.0 percent by weight ammonium chloride and an aqueous solution containing 0.2 percent by volume of TRI-S surfactant and 2.0 percent by weight ammonium chloride.

The compatibility was measured on a spectrophotometer by determining the percent transmittance of the solutions. The percent transmittance decreases if the copolymer is incompatible with the TRI-S surfactant. The results of these tests are shown in Table V.

TABLE V

| Test No. | Solution | % of Transmittance |
|---|---|---|
| 1. | Deionized water | 100.0 |
| 2. | 2% by weight NH$_4$Cl | 100.0 |
| 3. | 0.23% by weight of copolymer C and 2.0% by weight NH$_4$Cl | 98.6 |
| 4. | 1% by weight TRI-S and 2% by weight NH$_4$Cl | 83.6 |
| 5. | 0.23% by weight of copolymer C; 0.10% by weight TRI-S and 2.0% by weight NH$_4$Cl | 83.5 |

The results of these tests show that copolymer C was compatible with TRI-S surfactant.

EXAMPLE IV

The purpose of fine stabilization chemicals is to prevent or substantially reduce permeability declines caused by fines migration within subterranean formation. Therefore, it is most important that adsorption of the fines stabilization chemical on formation surfaces itself not cause a substantial reduction in formation permeability. Therefore, a series of regained permeability experiments were performed.

Regained permeability tests were performed using Berea cores placed in a Hassler sleeve. The test temperature was 140° F., the injection pressure was 50 psig, and the annulus pressure was 200 psig. The fluid injection sequence was:

1. standard laboratory brine
2. kerosene
3. standard laboratory brine
4. copolymer treatment solution
5. standard laboratory brine
6. kerosene The kerosene and laboratory brine were filtered through a 2 micron in-line filter.

The copolymer treatment solution was prepared using an aqueous solution containing 2.0 percent by weight ammonium chloride. The solution was filtered through a 0.45 micron filter.

The standard laboratory brine was a synthetic mixture composed of 240:18.1:1.34:1.0 parts by weight deionized water, sodium chloride, calcium chloride, and magnesium chloride hexahydrate respectively.

The viscosity values of the copolymer treatment solutions used in the tests were measured on a Brookfield Model LVT viscometer at 74° F. and are recorded in Table VI. These values are similar to the viscosity of water (1.0 cps). This indicates that the injectivity of the treatment solutions would be good.

TABLE VI

| Treatment Fluid | Viscosity - cps (spindle, rpm) |
|---|---|
| Copolymer A | 1.36 (UL, 60) |
| Copolymer E | 1.40 (UL, 60) |

The results of these tests are shown in Table VII and VIII.

TABLE VII

Permeability Damage Characteristics of Copolymer A

| Treatment Fluid, Vol (cc) | Cumulative Throughput (cc) | Stabilized Permeability (md)$^e$ |
|---|---|---|
| Lab Brine, 400 | 400 | 104.1 + 1.4 |
| Kerosene, 400 | 800$^b$ | 245.5 + 0.3 |
| Lab Brine, 550 | 1350$^c$ | 26.6 ± 0.2 |
| 0.25%$^a$ Copolymer A; 2% NH$_4$Cl, 100 | 1450 | $^d$ |
| Lab Brine, 1110 | 2560 | 22.4 ± 0.0 |
| Kerosene, 400 | 2960 | 185.2 ± 3.1 |

$^a$% by weight active polymer
$^b$7.0 cc brine was eluted
$^c$5.0 cc kerosene was eluted
$^d$injection in the reverse direction
$^e$average value ± standard deviation

TABLE VIII

Permeability Damage Characteristics of Copolymer E

| Treatment Fluid, Vol (cc) | Cumulative Throughput (cc) | Stabilized Permeability (md)$^f$ |
|---|---|---|
| Lab Brine, 800 | 800 | 551.5 |
| Kerosene, 400 | 1200$^b$ | 242.7 ± 0.3 |
| Lab Brine, 400 | 1600$^c$ | 33.5 ± 0.4 |
| 0.25%$^a$ Copolymer E | 1700 | $^d$ |
| Lab Brine, 415 | 2115 | 44.7 ± 0.7 |
| Kerosene, 400 | 2515$^e$ | 238.7 ± 0.3 |

$^a$% by weight active polymer
$^b$6.0 cc brine was eluted
$^c$4.2 cc kerosene was eluted
$^d$injected in the reverse direction
$^e$4.0 cc of water was eluted
$^f$average value ± standard deviation The results recorded in Table VII show that the post-treatment brine permeability declined by 15.6% and after the polymer treatment, the kerosene permeability declined by 24.6%. Although permeability declines were observed, they were substantially less than would be observed if fines migration had been occurring.

The results recorded in table VIII show that the post-treatment brine permeability did not decrease from its pretreatment value, and that the post-treatment kerosene permeability declined only 1.6% from its pretreatment value. Thus the permeability damage characteristics of Copolymer E were excellent.

The invention is not limited to the above-described specific embodiments thereof; it must be understood therefore, that the detail involved in the descriptions of these embodiments is presented for the purposes of illustration only, and that reasonable variations and modifications, which will be apparent to those skilled in the art, can be made of this invention without departing from the spirit and scope thereof.

What is claimed is:

1. A method of preventing or reducing the migration of fines in a permeable subterranean formation comprising:

contacting said fines in said permeable subterranean formation with an effective amount of an organic copolymer having recurring structural monomer units formed in a random fashion of the formula:

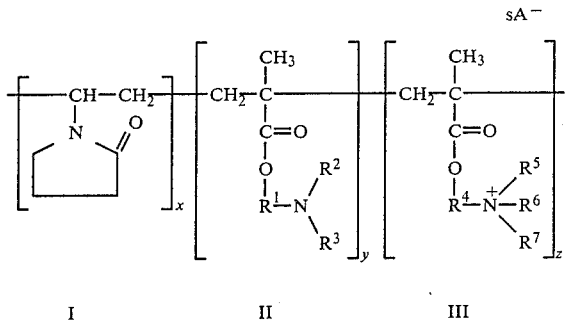

wherein
- $R^1$ and $R^4$ are independently selected from the group consisting of an alkylene group having 1 to about 4 carbon atoms;
- $R^2$, $R^3$, $R^5$, $R^6$, and $R^7$ are independently selected from the group consisting of methyl and ethyl;
- A is selected from the group consisting of chloride, bromide, iodide, hydroxide, and methyl sulfate;
- s is an integer equal to the number of said anions required to maintain electronic neutrality;
- x, y, and z are integers, the sum of which equals the total number of monomer units in the copolymer required to give a molecular weight in the range of from about 100,000 to about 1,500,000; and
- monomer unit I is present in the range of from about 80 to about 98 percent by weight of the copolymer;
- monomer unit II is present in the range of from about 2 to about 20 percent by weight of the copolymer; and,
- monomer unit III is present in the range of from about 0 to about 20 percent by weight of the copolymer.

2. The method recited in claim 1 wherein monomer unit II is selected from the group consisting of dimethylaminoethyl methacrylate, diethylaminomethyl methacrylate, dimethylaminomethyl methacrylate and diethylaminoethyl methacrylate.

3. The method recited in claim 2 wherein monomer unit III is selected from the group consisting of the methyl chloride salt of dimethylaminoethyl methacrylate, the methyl chloride salt of diethylaminoethyl methacrylate, the methyl sulfate salt of dimethylaminoethyl methacrylate, and the methylsulfate salt of diethylaminomethyl methacrylate.

4. The method recited in claim 3 wherein said fines are selected from the group consisting of silica, iron minerals, alkaline earth metal carbonates and mixtures thereof.

5. The method recited in claim 1 wherein organic polycationic copolymer comprises about 80 percent to about 98 percent by weight N-vinylpyrrolidone, about 2 percent to about 20 percent by weight of dimethylaminoethyl methacrylate and about 0 to about 20 percent by weight of the methyl sulfate salt of dimethylaminoethyl methacrylate.

6. The method recited in claim 1 wherein said molecular weight is about 1,000,000 and monomer unit I is present in an amount of about 80 percent by weight of the copolymer, monomer unit II is present in an amount of about 12 percent by weight of the copolymer and monomer unit III is present in an amount of about 8 percent by weight of the copolymer.

7. The method recited in claim 1 wherein said molecular weight is about 1,000,000 and monomer unit I is present in an amount of about 80 percent by weight of the copolymer and monomer unit II is present in an amount of about 20 percent by weight of the copolymer.

8. The method recited in claim 1 wherein said copolymer is dispersed in a carrier fluid.

9. The method recited in claim 8 wherein said carrier fluid comprises from about 0.1 to about 40.0 percent by weight of a salt and said salt is selected from the group consisting of an alkali metal halide, an alkaline earth metal halide, an ammonium halide, and mixtures thereof.

10. The method recited in claim 9 wherein said copolymer is present in said carrier fluid in the range of from about 0.01 to about 5.0 percent by weight of the carrier fluid.

11. The method recited in claim 9 wherein said carrier fluid further comprises a mineral acid selected from the group consisting of hydrofluoric acid, hydrochloric acid and mixtures thereof.

12. The method recited in claim 1 wherein said method is used in conjunction with a secondary recovery operation.

13. A method of treating an earthen formation comprising fines to reduce loss of permeability in said formation because of the migration of said fines comprising:
contacting said formation with an effective amount of an organic polycationic copolymer having recurring structural monomer units formed in a random fashion of the formula:

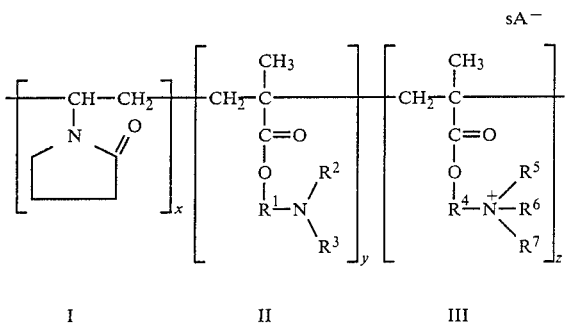

wherein
- $R^1$ and $R^4$ are independently selected from the group consisting of an alkylene group having 1 to about 4 carbon atoms;
- $R^2$, $R^3$, $R^5$, $R^6$, and $R^7$ are independently selected from the group consisting of methyl and ethyl;
- A is selected from the group consisting of chloride, bromide, iodide, hydroxide, and methyl sulfate;
- s is an integer equal to the number of said anions required to maintain electronic neutrality;
- x, y, and z are integers, the sum of which equals the total number of monomer units in the copolymer required to give a molecular weight in the range of from about 100,000 to about 1,500,000; and monomer unit I is present in the range of from about 80 to about 98 percent by weight of the copolymer;

monomer unit II is present in the range of from about 2 to about 20 percent by weight of the copolymer; and, monomer unit III is present in the range of from about 0 to about 20 percent by weight of the copolymer.

14. The method recited in claim 13 wherein monomer unit II is selected from the group consisting of dimethylaminoethyl methacrylate, diethylaminomethyl methyacrylate, dimethylaminoethyl methacrylate and diethylaminoethyl methacrylate.

15. The method recited in claim 14 wherein monomer unit III is selected from the group consisting of the methyl chloride salt of dimethylaminoethyl methacrylate, the methyl chloride salt of diethylaminomethyl methacrylate, the methyl sulfate salt of dimethylaminoethyl methacrylate, and the methyl sulfate salt of diethylaminomethyl methacrylate.

16. The method recited in claim 13 wherein said fines are selected from the group consisting of silica, iron minerals, alkaline earth metal carbonates and mixtures thereof.

17. The method recited in claim 13 wherein the polycationic copolymer comprises about 80 percent to about 98 percent by weight N-vinylpyrrolidone, about 2 percent to about 20 percent by weight of dimethylaminoethyl methacrylate and about 0 to about 20 percent by weight of the methyl sulfate salt of dimethylaminoethyl methacrylate.

18. The method recited in claim 17 wherein said copolymer is dispersed in a carrier fluid and the carrier fluid comprises from about 0.1 to about 40.0 percent by weight of a salt and said salt is selected from the group consisting of an alkali metal halide, an alkaline earth metal halide, an ammonium halide, and mixtures thereof.

19. A method of stabilizing migrating fines having a diameter of less than 10 microns in a subterranean formation comprising more than 5 percent by weight migrating fines and less than 2 percent by weight swelling clays comprising:

contacting the fines with an effective amount of an organic polycationic copolymer having a molecular weight of about 1,000,000 and having recurring structural monomer units formed in a random fashion of the formula:

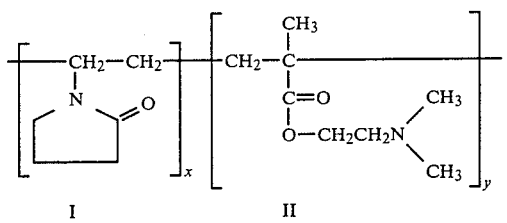

wherein
monomer unit I is present in an amount of about 80 percent by weight of the copolymer; monomer unit II is present in an amount of about 20 percent by weight of the copolymer.

* * * * *

UNITED STATES PATENT AND TRADEMARK OFFICE
CERTIFICATE OF CORRECTION

PATENT NO. : 4,536,303
DATED : August 20, 1985
INVENTOR(S) : John K. Borchardt

It is certified that error appears in the above-identified patent and that said Letters Patent is hereby corrected as shown below:

Column 4, at line 59, after the word "sulfate" insert the word --salt--.

Column 6, at line 25, delete the word "by" and insert therefore --but--.

Column 13, at line 13 and 14, delete the word "methyacrylate" and insert therefore --methacrylate--.

Signed and Sealed this

Twenty-fourth Day of December 1985

[SEAL]

Attest:

DONALD J. QUIGG

Attesting Officer

Commissioner of Patents and Trademarks